(12) United States Patent
Eckhardt et al.

(10) Patent No.: US 9,207,045 B2
(45) Date of Patent: Dec. 8, 2015

(54) OPTICAL DEVICE FOR GUIDING RADIATION FROM AN OBJECT SCENE TO A DETECTOR USING AN OPTICAL LINK AND METHOD FOR GUIDING RADIATION FROM THE OBJECT SCENE TO THE DETECTOR BY AN OPTICAL LINK

(75) Inventors: Reiner Eckhardt, Ueberlingen (DE);
Joachim Barenz, Ueberlingen (DE);
Hubert Kuppel, Stockach (DE)

(73) Assignee: DIEHL BGT DEFENCE GMBH & CO. KG, Ueberlingen (DE)

( * ) Notice: Subject to any disclaimer, the term of this patent is extended or adjusted under 35 U.S.C. 154(b) by 650 days.

(21) Appl. No.: 13/493,068

(22) Filed: Jun. 11, 2012

(65) Prior Publication Data

US 2012/0312968 A1 Dec. 13, 2012

(30) Foreign Application Priority Data

Jun. 11, 2011 (DE) .......................... 10 2011 104 023

(51) Int. Cl.
| | | |
|---|---|---|
| *H01J 3/14* | (2006.01) | |
| *F41G 7/22* | (2006.01) | |
| *G02B 26/08* | (2006.01) | |
| *G02B 5/04* | (2006.01) | |
| *G02B 27/64* | (2006.01) | |

(52) U.S. Cl.
CPC ............ *F41G 7/2213* (2013.01); *F41G 7/2253* (2013.01); *F41G 7/2293* (2013.01); *G02B 5/04* (2013.01); *G02B 5/045* (2013.01); *G02B 26/0883* (2013.01); *G02B 27/644* (2013.01)

(58) Field of Classification Search
CPC ... F41G 7/2213; F41G 7/2253; F41G 7/2293; F41G 7/22; G02B 27/644; G02B 5/04; G02B 5/045; G02B 26/0883; G01J 1/04; G01J 1/0477
USPC ............. 250/216, 201.6, 201.1, 203.1, 203.2, 250/235, 234; 356/3.05, 3.16, 19; 359/554, 359/557, 834, 831, 837, 894, 429, 430, 359/431; 244/3.17, 3.16, 3.15, 3.1
See application file for complete search history.

(56) References Cited

U.S. PATENT DOCUMENTS

| 2,593,904 A | 4/1952 | Ludewig |
|---|---|---|
| 3,994,557 A | 11/1976 | Hopkins |

(Continued)

FOREIGN PATENT DOCUMENTS

| DE | 15278 | 10/1962 |
|---|---|---|
| DE | 80814 B | 11/1975 |

(Continued)

*Primary Examiner* — Que T Le
*Assistant Examiner* — Jennifer Bennett
(74) *Attorney, Agent, or Firm* — Laurence Greenberg; Werner Stemer; Ralph Locher

(57) ABSTRACT

An optical device for guiding radiation from an object scene to a detector contains an alignment device for pivoting a field of view of the detector relative to a predetermined direction, a detector optical unit and an optical articulation for guiding the beam path from the pivoted field of view into the detector optical unit. In order to achieve a compact configuration of the device, the optical articulation has a reversing prism, in which beams running in the optical axis of the articulation are refracted towards a mirror surface of the reversing prism and are reflected by the reflection surface.

15 Claims, 5 Drawing Sheets

(56) References Cited

U.S. PATENT DOCUMENTS

| | | | |
|---|---|---|---|
| 4,087,061 A | 5/1978 | Burt | |
| 4,404,592 A | 9/1983 | Pepin et al. | |
| 4,773,754 A * | 9/1988 | Eisele | 356/139.05 |
| 4,984,892 A | 1/1991 | Hofmann | |
| 5,512,741 A | 4/1996 | Levaillant et al. | |
| 5,592,331 A | 1/1997 | Eastcott | |
| 8,466,407 B2 * | 6/2013 | Martin et al. | 250/216 |
| 2009/0027750 A1 * | 1/2009 | Kempas | 359/226 |
| 2009/0040634 A1 | 2/2009 | Baumann | |
| 2010/0327105 A1 | 12/2010 | Eckhardt | |
| 2011/0043904 A1 | 2/2011 | Lücke et al. | |

FOREIGN PATENT DOCUMENTS

| | | |
|---|---|---|
| DE | 3805642 C1 | 6/1989 |
| DE | 10135222 A1 | 2/2003 |
| DE | 102007035574 A1 | 2/2009 |
| DE | 10 2008 026 990 A1 | 12/2009 |
| DE | 10 2009 029 895 A1 | 1/2011 |
| DE | 102009037921 A1 | 3/2011 |
| EP | 1203978 A1 | 5/2002 |
| FR | 1201402 A | 12/1959 |
| FR | 2690997 A1 | 11/1993 |
| GB | 769444 A | 3/1957 |
| WO | 2005114987 A1 | 12/2005 |

* cited by examiner

OPTICAL DEVICE FOR GUIDING RADIATION FROM AN OBJECT SCENE TO A DETECTOR USING AN OPTICAL LINK AND METHOD FOR GUIDING RADIATION FROM THE OBJECT SCENE TO THE DETECTOR BY AN OPTICAL LINK

CROSS-REFERENCE TO RELATED APPLICATION

This application claims the priority, under 35 U.S.C. §119, of German application DE 10 2011 104 023.8, filed Jun. 11, 2011; the prior application is herewith incorporated by reference in its entirety.

BACKGROUND OF THE INVENTION

1. Field of the invention

The invention relates to an optical device for guiding radiation from an object scene to a detector containing an alignment device for pivoting the field of view of the detector relative to a predetermined direction, a detector optical unit and an optical articulation for guiding the beam path from the pivoted field of view into the detector optical unit.

Guided missiles are usually equipped with an optical target tracking device containing a homing head at the front tip of the guided missile. By virtue of the, in some instances, extremely high flying velocity for which such a guided missile has to be designed, the front tip constitutes an aerodynamically exposed position in respect of which stringent requirements are made of the design and the structural volume. These stipulations are usually at odds with requirements from missile guidance, which demand, for example, a large optical squint angle, a high optical range of target identification and target tracking and a precise outputting of the target offset.

Published, non-prosecuted German patent application DE 10 2009 029 895 A1, corresponding to U.S. patent publication No. 2010/0327105, discloses a homing head of a guided missile, wherein a prism arrangement forms an optical articulation. When the field of view of the detector of the homing head is pivoted, the prism right at the front of this arrangement together with an input optical unit is concomitantly pivoted with the field of view, whereas the subsequent prisms are stationary in a structurally fixed manner or are concomitantly moved with a rolling frame. This optical articulation is relatively voluminous, however, as a result of the prism construction.

Published, non-prosecuted German patent application DE 10 2008 026 990 A1 discloses an optical articulation which dispenses with the voluminous prisms and achieves a squint angle of 90 to −90 degrees by use of mirrors. However, this arrangement, too, has a relatively large structural size.

SUMMARY OF THE INVENTION

It is accordingly an object of the invention to provide an optical device for guiding radiation from an object scene to a detector and a method for guiding radiation from the object scene to the detector which overcome the above-mentioned disadvantages of the prior art methods and devices of this general type, which specifies an optical system having a large optical squint angle, which optical system can be embodied particularly compactly.

The object is achieved by an optical device of the type mentioned in the introduction, wherein the optical articulation has, according to the invention, a reversing prism, in which beams running in the optical axis of the articulation are refracted towards a reflection surface of the reversing prism and are reflected by the reflection surface.

With a reversing prism, the optical properties of a mirror and of a prism can be combined with one another. It makes it possible for a beam arriving from the front to be passed on optically towards the rear, which would not be possible with a simple mirror, and it makes it possible to realize a squint angle or pivoting of the field of view of ±90 degrees or more. A serial arrangement of a plurality of mirrors or prisms is not necessary, for which reason a very compact design of the optical articulation can be achieved.

The optical device can be part of a camera for imaging the object scene onto the detector. In this respect, the optical device can be a pivoting attachment for a camera lens. The field of view can be the input-related field of view of the detector, that is to say that visual range with which the detector "looks" into the object scene or which is imaged onto the detector.

The optical device can also contain an active device for emitting radiation which is directed to a specific position of the object scene by the pivoting of the field of view or of the optical articulation. If appropriate, a detector can be dispensed with. If a detector is absent, the field of view can relate to the emission field of a radiation source, wherein the detector optical unit can be a beam shaping optical unit. The detector can therefore be replaced or supplemented by a radiation source. The radiation source can be a laser source, such that the optical device serves as a laser aligning device.

The optical device can contain an input optical unit, which contains the first optical element on which radiation coming from the object scene impinges. The alignment device can be a mechanical device for pivoting an optical component, such that the field of view is pivoted, for example a device for pivoting the input optical unit, such that the latter can be directed onto an object of the object scene. The pivoting can be effected—very generally—relative to the detector or—even more generally—relative to a positionally fixed element, that is to say an element that is connected for example rigidly to a housing of the optical device, for example a missile outer shell.

The pivoting of the field of view is effected in a relative fashion, that is to say with respect to a predetermined direction. The latter can be a rolling axis, e.g. of the optical device, of a homing head or of a guided missile, an axis of symmetry or some other direction determined in advance. The pivoting of the field of view can be effected with the aid of a rolling-pitching device by which the field of view, with or without an input optical unit, can be pivoted about a pitch axis within a pivoting angle range, for example +/−90 degrees. In addition, it is advantageous if the field of view, and/or an input optical unit, can be rotated about a rolling axis that is expediently an axis of symmetry of the optical device. In the case of a guided missile or a homing head therefor, the rolling axis is expediently the rolling axis of the guided missile. Advantageously, the rolling axis and the pitch axis intersect at the center of a partly spherical entrance window of the device, for example of a dome of a homing head, at right angles.

As detector, an image sensor is advantageously for example a multi-element matrix detector. It is preferably arranged centrally and with its reception plane at least virtually at right angles with respect to the rolling axis. The detector optical unit is installed upstream of the detector. The detector and the detector optical unit are preferably mounted in a structurally fixed manner or in a manner fixed to the housing. However, it is also possible to mount the detector optical unit and, in particular, also the detector in rolling fashion, that is to say in a manner movable about the rolling axis with respect to a housing, for example in a rolling frame. The field of view can preferably be directed at all points of a half-space, for example the front half-space of a missile. For this purpose, it is preferably pivotable by +/−90 degrees about a pitch axis and preferably rotatable by 360° about a rolling axis, wherein rolling about a rolling axis given the presence of pitching pivoting can also be designated as pivoting. The field of view of the detector is expediently between ±2 degrees and ±10 degrees about a central direction.

The optical articulation contains one reversing prism, although a plurality of reversing prisms, in particular two reversing prisms, are also advantageous, which are expediently stacked one on top of another. In this case, the reflection surfaces are expediently arranged parallel to one another. Advantageously, all the optical properties of the optical articulation are achieved just by the at least one reversing prism, such that additional components can be dispensed with. Furthermore, it is advantageous if the reversing prisms of the optical articulation are arranged rigidly with respect to one another, such that the optical pivoting properties occur as a result of the prisms which are rigid with respect to one another. In this way, the mechanics of the optical articulation can be kept simple. The optical axis of the optical articulation can be parallel to the central axis of the beam bundle incident from the field of view or aligned by the articulation.

The reversing prism is a prism having at least one reflection surface at which the beam path is at least partly specularly reflected. It is preferably a single prism having an entrance surface, at least one reflection surface different from the latter, and expediently having an exit surface different from the two first-mentioned surfaces. A roof edge prism is particularly suitable, in particular a dove prism. The reversing prism is expediently arranged in the optical device such that the beam path is specularly reflected only once at only one reflection surface. The mirror surface is preferably a hypotenuse surface of the prism; it is expediently reflectively coated, but the reflective coating is not necessary. It is particularly advantageous if the ridge line of the reversing prism runs parallel to the pitch axis. It is additionally beneficial for compactness if the pivoting axis or the pitch axis runs parallel to the hypotenuse surface, in particular lies in the hypotenuse surface.

In the reversing prism, a parallel beam bundle incident in a front roof surface is expediently refracted towards the hypotenuse surface, reflected there and refracted again at the rear roof surface and thus output as a mirrored beam bundle. Expediently, the other optical beam properties remain unchanged. In this way, the rear beam bundles thus obtained can be introduced into a customary detector optical unit without further optical measures. If the reversing prism is pivoted by rotation of the pivoting axis or pitch axis perpendicular to the rolling axis, then, from the point of view of the detector, the beam bundles at the input of the prisms are rotated by twice the angle on account of the mirroring in the prism. A mechanical prism tilting by 45 degrees thus generates the required or advantageous optical squint angle tilting by 90 degrees.

The material of the reversing prism is dependent on the radiation frequency used. Expediently, the detector is an infrared detector and the material of the reversing prism is a material transparent to infrared radiation, in particular silicon. The form of the reversing prism, in particular the angle of two roof surfaces and a hypotenuse surface of the reversing prism with respect to one another, can be made dependent on the refractive index and thus on the radiation frequency and the material. In particular, the diameter of the field of view is taken into account in the choice of geometry of the prism, since a large field of view is associated with a large beam divergence, including in the prism. Thus, advantageously, all beams incident in the reversing prism—including at different angles of incidence in accordance with the extent of the field of view—should be led out from the reversing prism again in the direction of the detector objective.

One advantageous embodiment of the invention provides for the reversing prism to have a hypotenuse surface aligned parallel to the optical axis. In this case, the alignment of the optical axis can relate to the beam path upstream of the reversing prism, that is to say between the object scene and the reversing prism. The parallelism expediently occurs with the field of view not having been pivoted. In this way, it is possible—using the hypotenuse surface as a mirror surface—for a beam entering into the reversing prism from the front to be led out from the reversing prism in the same direction towards the rear, thereby enabling a deflection—unchanged in the beam direction—of the beam from the reversing prism, in association with an image mirroring which, however, is of no significance for the beam direction.

A pivoting of the field of view by ±90 degrees can be made possible in a particularly simple manner if the optical articulation has two reversing prisms which act identically in the beam path and which are expediently arranged alongside one another, one above the other or generally: adjacent, in the beam path. Radiation from the object scene can simultaneously be directed onto the two reversing prisms, which are advantageously arranged in parallel fashion in the sense of not serially. The two prisms can be arranged in a plurality of ways with respect to one another, and can expediently be stacked one on top of another. However, if the two reversing prisms adjoin one another at their hypotenuse surfaces, then it is possible to create a particularly compact optical articulation with a high radiation efficiency. A particularly compact arrangement can be achieved if the two reversing prisms lie with their reflection surfaces one on top of the other. In this case, they can form an optical cube.

Furthermore, it is advantageous if both reversing prisms—in conjunction with the detector optical unit—in each case image an overall image of the object scene onto the detector. These overall images lie one above another, such that a point on the object scene is imaged by both reversing prisms onto the same point at the detector.

A further advantageous embodiment of the invention provides for the pivoting axis of the pivoting of the field of view to run through a center of symmetry of the optical articulation. The center of symmetry can be a geometrical midpoint, a geometrical center of a mirror plane, a center of gravity, a midpoint of a line of intersection of two planes of symmetry or the like. By virtue of this arrangement, the optical articulation can be kept particularly compact.

The number of reversing prisms used for the optical articulation is arbitrary, in principle. Thus, it is also possible to use more than two deflection prisms which are arranged in the beam path one above another, that is to say in parallel fashion in the sense of not serially. Expediently, each of the reversing prisms images the entire field of view on the detector. Possible shadings do not impair such an operative principle. The deflection prisms can be stacked one on top of another. For this purpose, they are expediently equipped with a surface embodied parallel to the hypotenuse surface, such that the parallel planes of the reversing prisms can be placed onto one another. The use of microprisms is also advantageous, the dimensioning of which is expediently less than 1 mm perpendicular to the hypotenuse surface.

In principle, the advantage of a large entrance aperture of the device is at odds with the desire for a compact design.

Nevertheless, in order to achieve an entrance aperture of the device which is larger than the entrance aperture of the optical articulation, it is advantageous to provide an input optical unit upstream of the optical articulation. The input optical unit is expediently embodied such that it compacts the beam path incident from the object scene, with the result that the beam path passing through the entrance aperture of the input optical unit is therefore compacted in the exit aperture, and the exit aperture is, for example, smaller than the entrance aperture. As a result, the compacted beam path can be directed directly onto the optical articulation, which can be kept small as a result. In this way, a large entrance aperture of the optical device can be combined with a compact design of the optical articulation.

The compaction of the input optical unit is expediently effected by a factor of 1.2 to 10, in particular. The factor expediently relates to the diameter ratio of the entrance aperture to the exit aperture of the input optical unit. Expediently, the input optical unit is the first optical means of the device into which the beam path coming from the object scene in an unchanged manner impinges first, if appropriate apart from an entrance window, for example a homing head dome.

An input optical unit upstream of the optical articulation, that is to say between the optical articulation and the object scene, is expediently afocal, such that a parallel beam incidence from the object scene is directed onto the optical articulation in parallel fashion. As a result, image aberrations caused by the pivoting can be kept small or even avoided.

Furthermore, it is proposed that the input optical unit compensates for optical properties of an entrance window that effects mechanical shielding from the surroundings, for example of a homing head dome. The compensation expediently takes place such that an afocal nature with respect to the optical articulation is maintained. Within the meaning of such an afocal input optical unit, the entrance window can also be understood as part of the input optical unit.

In order to avoid image disturbances caused by a pivoting, it is furthermore advantageous if the optical articulation is afocal. This can make it possible for the beam path to be parallel both upstream and downstream of the optical articulation.

The optical articulation tracks a beam path to a pivoting of the field of view such that the field of view remains imaged onto the detector. The size of the imaging, for example a planar image or else just a point, is unimportant in this case. For the purpose of optical tracking, the optical articulation is expediently provided with a rotation device for rotating at least one part of the optical articulation, in particular the entire optical articulation. Advantageously, the latter is embodied such that the optical articulation is concomitantly pivoted with always half the pivoting angle of the field of view. In this case, all optical elements of the optical articulation are expediently rotated synchronously. The axis of rotation of the rotating process is expediently the pivoting axis during the pivoting of the field of view. The rotation device can be a rotation drive. However, it already suffices if it has a bearing that serves for rotating the articulation.

The alignment device and the rotation device can be moved in a manner driven separately from one another, a synchronization of the movement being expedient for the positional constancy of the imaging of the field of view onto the detector. A particularly simple synchronization can be achieved if the alignment device and the rotation device are mechanically forcibly coupled. Such a forcible coupling can be effected by a gear mechanism for example.

Mechanical loads during such a forcible coupling can be kept small if a force flux for rotating the articulation is led via the alignment device into the rotation device. Since the alignment device rotates with twice the angle with respect to the rotation device, the rotation is thereby stepped down, which is mechanically protective.

Furthermore, it is advantageous if an input optical unit and the optical articulation are in each case mounted independently of one another in terms of their movement for the pivoting of the field of view. The mounting can be effected in a rolling frame, such that both elements are rollable.

The invention is additionally directed to an optical device for guiding radiation from an object scene to a detector comprising an alignment device for pivoting the field of view of the detector relative to a predetermined direction and an optical articulation for guiding the beam path from the pivoted field of view to the detector, e.g. into a detector optical unit. It is proposed that the device has, according to the invention, a shielding which is led around the optical articulation and which shields the optical articulation against incident radiation that is not incident through the entrance or exit aperture of the optical articulation. Expediently, the shielding shields against all externally incident radiation that is not incident through the entrance or exit aperture. It goes without saying that the shielding does not have to relate to the radiation emitted by the shielding itself, in particular infrared radiation, but rather only to externally incident radiation, in particular from outside the shielding. Disturbing stray light can thus be reduced or even completely avoided. This is particularly advantageous since an optical articulation embodied with a deflection prism has particularly large entrance surfaces into which spurious radiation can penetrate and pass to the detector without a shielding.

It goes without saying that this invention directed to the shielding can also be combined with the abovementioned invention of the reversing prism for the optical articulation and with all details described with this invention.

In order to be able to adapt well to a movement of the optical articulation in the case of a pivoting, it is advantageous if the shielding has at least one shielding element that is variable in terms of the surface area. Such a shielding element can be, for example, bellows or an elastic element or some other suitable element which can be enlarged and reduced in size. The surface variation relates to the shielding surface.

One particularly advantageous further development provides for a mechanical coupling to an input optical unit to be present, which brings about a surface variation coupled to a pivoting of the field of view. A dedicated drive for surface variation can be dispensed with in this way.

The shielding is movable with particularly low friction and thus rapidly and with low expenditure of force if it has at least one unwinding system and the shielding element can be unwound. The shielding element is expediently wound up on the unwinding device and can be at least partly unwound during the operation of the optical device, in particular in accordance with a surface variation or a pivoting of the field of view.

It is additionally proposed that the shielding element is mechanically forcibly coupled with a movement of an input optical unit in terms of its movement. In this case, expediently a force flux for the movement is led via an element that acts on the input optical unit. In this way, the input optical unit or the element acting thereon can bring about the movement of the shielding element and, in particular its surface variation. A force flux can run from a housing via the element to the shielding element.

As a result of the use of a reversing prism, an image rotation takes place on the detector when the field of view is pivoted. It goes without saying that it is possible and advantageous to correct this image rotation with an optical element. However, a particularly compact solution consists in providing a process device which is prepared for determining an image displacement, that is to say image rotation or the like—designated in a generalized manner as image shift. On the basis of the data determined, the image shift can be corrected or calculated back using image processing device. The determination is expediently effected with the image clock timing. The image shift can be caused by the pivoting of the field of view and/or an entrance window alignment with respect to the object scene, that is to say for example by a change in the flight direction of a guided missile. Expediently, the process device makes image correction data available to an image processing. The image shift can thereby be corrected or eliminated computationally.

A parallel beam path can be produced between the optical articulation and the detector optical unit in a particularly simple manner. Such a location is particularly suitable for accommodating a functional module for the damping influencing of the beam path, for the spectral optical influencing of the beam path and/or for coupling radiation into or out of the beam path. Other influencings are also possible. The functional module can be a passive or active module that only receives or only or also emits radiation, such as a laser beam. The parallelism relates to beams incident in the entrance aperture of the optical device in parallel fashion. Owing to a planar field of view, not only parallel beams are present, of course, but this non-parallelism is not at odds with the term parallel beam path as used here.

The invention is additionally directed to a homing head for a guided missile containing an optical device as described above. Expediently, the homing head contains a partly spherical entrance window in the form of a dome having a sphere center. The homing head can be embodied particularly compactly or with high luminous intensity if the pivoting axis of the pivoting of the field of view runs through the sphere center. In particular, the center of symmetry of the optical articulation is also arranged in the sphere center.

The invention is additionally directed to a guided missile containing a homing head as described above.

Furthermore, the invention is directed to a method for guiding radiation from an object scene to a detector or from a radiation source in the direction of an object scene. For the purpose of simplification, mention is made hereinafter only of guiding the radiation to the detector, but the embodiment of the active emission by the optical articulation into the object scene is intended to be included here. In the method, a field of view of the detector is pivoted relative to a predetermined direction and radiation is guided from the region of the field of view from the object scene through an optical articulation and a detector optical unit to the detector.

It is proposed that the optical articulation has, according to the invention, a reversing prism, which, in the case where the field of view is pivoted by a pivoting angle, is concomitantly pivoted by half of the pivoting angle. In this way, the mode of action of a mirror can be used and radiation incident from the front can be passed on 180 degrees towards the rear. The object scene can thereby be scanned or illuminated particularly compactly.

Further advantages will become apparent from the following description of the drawing. Exemplary embodiments of the invention are illustrated in the drawing. The invention is not restricted to these exemplary embodiments—including with regard to functional features—nor should the exemplary embodiments be considered as separate from one another. Thus, features of any exemplary embodiment that are suitable in any way for this can also be considered explicitly in isolation, removed from one exemplary embodiment and/or introduced into another exemplary embodiment in order to supplement the latter.

Other features which are considered as characteristic for the invention are set forth in the appended claims.

Although the invention is illustrated and described herein as embodied in an optical device for guiding radiation from an object scene to a detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
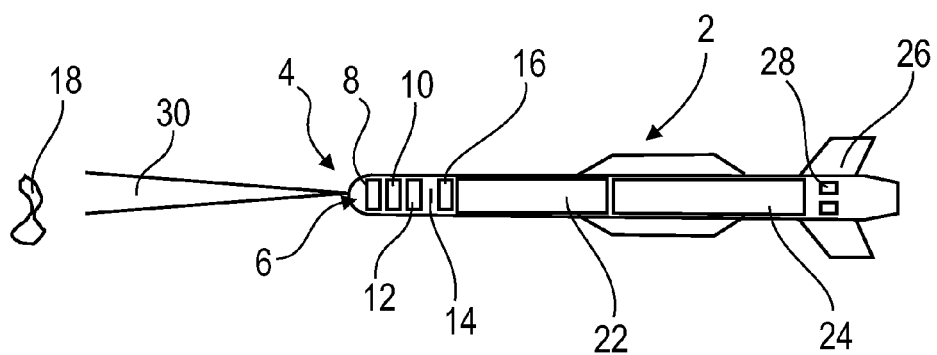
FIG. 1 is a diagrammatic, side view of a guided missile having a homing head according to the invention.

Referring now to the figures of the drawing in detail and first, particularly, to FIG. 1 thereof, there is shown a guided missile 2 containing a homing head 4, which has an optical device 6 containing an input optical unit 8, an optical articulation 10, a detector optical unit 12, and a detector 14. A control unit 16 of the guided missile 2 serves for controlling the movable parts of the optical device 6 and for carrying out an image processing of images of an object scene 18 that was imaged onto the detector 14 by the optical device 6. Moreover, the guided missile 2 contains a warhead 22, a rocket motor 24, a tail assembly 26, which is moved by actuators 28 driven by the control unit 16 on the basis of signals of the image processing.

Figure 2:
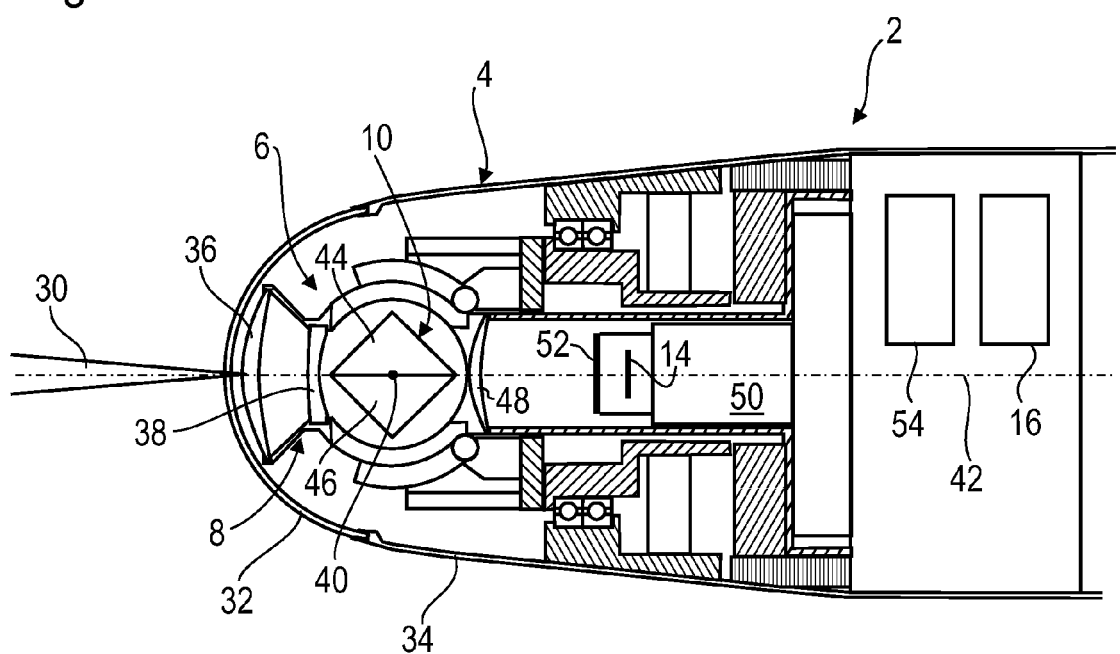
FIG. 2 is a sectional view of a homing head of the guided missile from FIG. 1.

A schematic sectional drawing in a plan view of the homing head 4 is illustrated in FIG. 2. The homing head 4 is equipped with a transparent dome 32, composed of sapphire, for example, which is fixedly inserted into the outer shell 34 of the guided missile 2. The optical device 6 is arranged behind the dome 32, wherein the dome 32 can be regarded as part of the optical device 6 or a separate unit. The input optical unit 8 is equipped with two lenses 36, 38, which can jointly be pivoted about a pitch axis 40 and rotated about a rolling axis 42 of the guided missile 2. The pivotability about the pitch axis 40 is ±90 degrees, such that the field of view 30 of the optical device 6 or of the detector 14 can be pivoted into the entire front half-space. The size of the rectangular field of view of the detector 14 is approximately 3°×3°, the field of view 30 thereof into the object scene 18 through the input optical unit 8 being circular ±3° and thus having a diameter of approximately 6°.

The optical articulation 10 contains two reversing prisms 44, 46, which are placed onto one another in each case at their hypotenuse surface. The two reversing prisms 44, 46 together form an optical cube, which likewise can be pivoted about the pitch axis 40 and can be rotated about the rolling axis 42.

The detector optical unit 10 illustrated schematically by a lens 48 is arranged between the optical articulation 10 and the detector 14, and images the excerpt from the field of view 30 of the object scene 18 onto the detector 14. The detector 14 is an infrared detector that is sensitive in the medium infrared. However, any other spectral sensitivities are also possible and advantageous. A cooler 50 is present for cooling the detector 14, the cooler window 52 of the cooler being arranged between the detector optical unit 12 and the detector 14. An inertial measurement unit 54 and the control unit 16, which are in each case only indicated schematically are arranged in the rear region of the homing head 4.

The detector 14 is embodied as an image sensor in the form of a matrix detector having a multiplicity of detector elements arranged in matrix form, the surface center of which lies on the rolling axis 42 and thus at any pitching angle always on the optical axis, that is to say in the center of the field of view 30.

Figure 3:
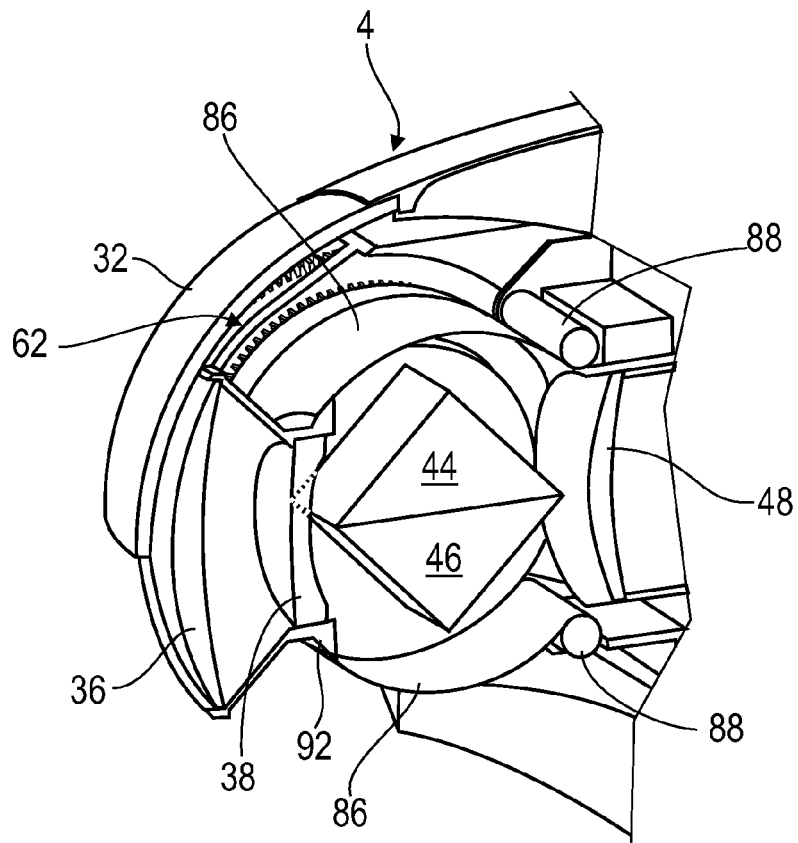
FIG. 3 is a perspective view of an input optical unit and an optical articulation of the homing head from FIG. 2, including a shielding element.

FIG. 3 shows a slightly schematically depicted perspective view of the front part of the homing head 4. The illustration is depicted in accordance with FIG. 2 in a perpendicular section, such that the two reversing prisms 44, 46 and the lenses 36, 38, 48 are illustrated sectionally in the center. Further details in the lower region of the homing head 4 are omitted, as is the lower half of the dome 32.

Figure 4:
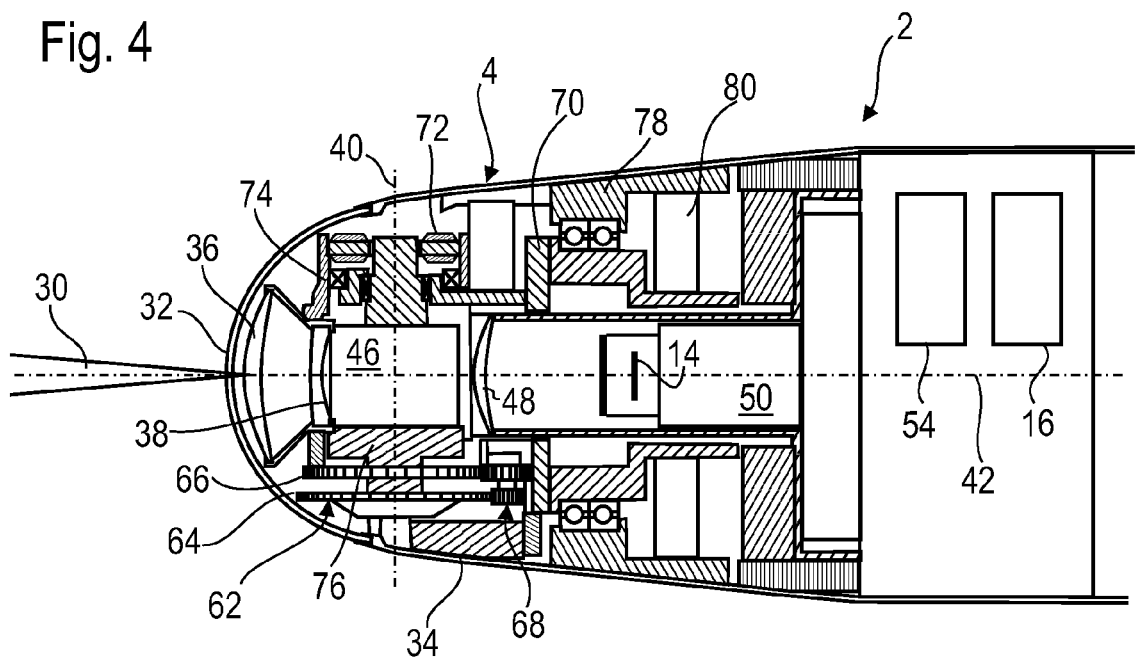
FIG. 4 is a sectional, plan view of the homing head from FIG. 2.

FIG. 4 illustrates the homing head 4 in a sectional view from below, such that the view looks at the reversing prism 46 from below, for example, with respect to the optical articulation 10.

The optical elements and beam path are now described.

Figure 5:
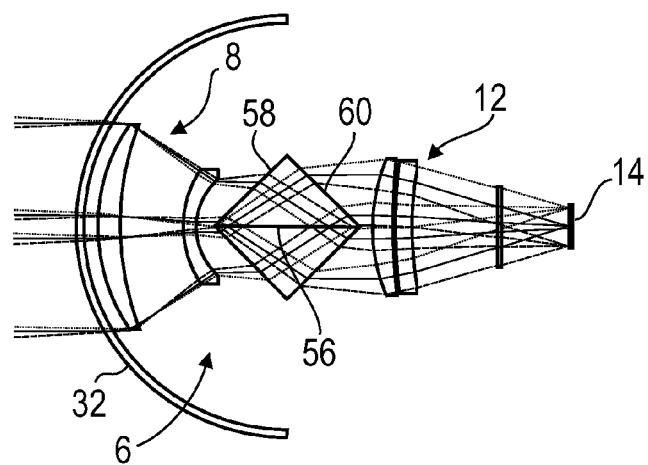
FIGS. 5-7 are illustrations showing beam paths through an optical device of the homing head in the case of an input optical unit directed towards the front, tilted obliquely to the side and tilted by 90 degrees.
Figure 6:
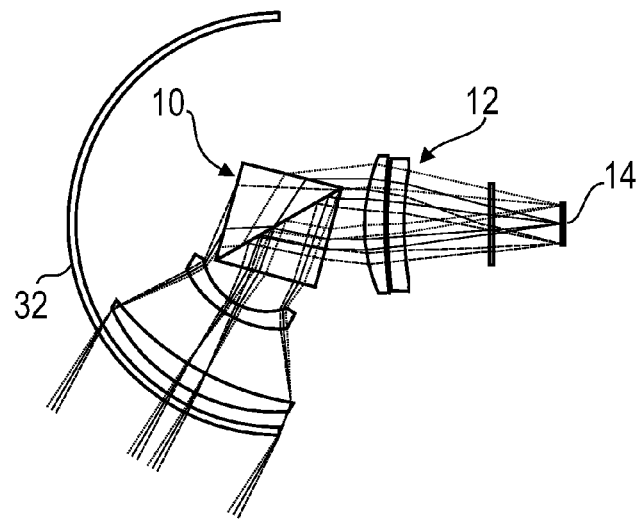

With reference to the sectional view from FIG. 2 and the beam path drawings from FIGS. 5, 6 and 7, an explanation is given below of the optical imaging of objects from the object scene 18 onto the detector 14. Radiation to be detected comes from the viewing scenario of the homing head 4 with background and target objects which become situated in the field of view 30. The field of view 30 is aligned during operation by rotation of individual optical elements by a rolling-pitching frame system. The alignment is effected, for example by a pilot of an aircraft carrying the guided missile or by a radar of the carrier aircraft. The used angle of the incident radiation varies in the viewing angle range of the optical system by approximately ±3 angular degrees with respect to the central optical axis thereof, the line of sight of the homing head 4. Thus and owing to the relatively wide optical working distance during the target identification and target tracking by the homing head 4, the objects of the scenario are imaged from almost parallel radiation onto the detector 14.

Figure 7:
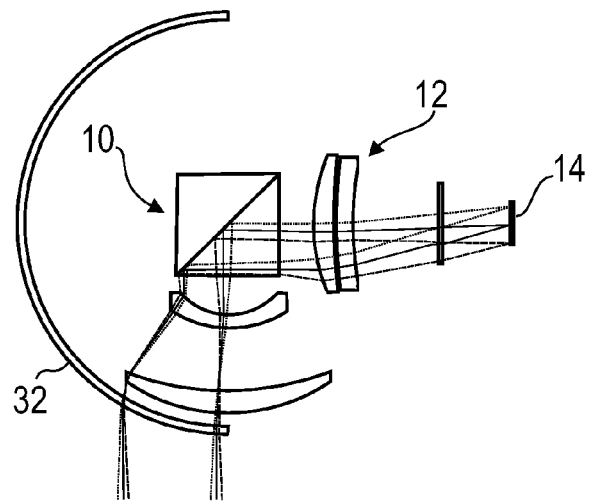

The entrance aperture of the input optical unit 8 pivotable about the pitch axis 40 and rolling axis 42 is determined by the opening of the entrance lens 36 but also by the shading of the dome edge at large squint angles, as is illustrated in FIG. 7. Up to a pitching deflection of 60° from the rolling axis 42, which is the axial direction of the guided missile 2, no dome shading takes place, as can be seen in FIG. 6. The full entrance aperture of the entrance lens 36 can be used. Starting from pitching angle deflection of approximately 60°, the dome shading begins, which increases to approximately 50% up to pitching angle deflection of 90°. In the case of such a large pitching angle deflection, this fundamental effect brings about an acquisition range of the homing head 4 reduced by approximately 30%. For the symmetrical dome 32 in the shape of a sphere section, this applies to any position or alignment of the field of view 3 about the rolling axis 42 with corresponding pitching angles.

The input optical unit 8 is embodied as a thermally stable afocal unit, that is to say that it is an afocal optical unit. A parallel beam path, illustrated by solid lines in FIGS. 5 to 7, is thus guided through the input optical unit 8 in parallel fashion to the optical articulation 10. However, the beam path is compacted, by the diameter factor 2 or area factor 4 in the exemplary embodiment shown, other such ratios of entrance aperture to exit aperture between 1.1 and 10 also being conceivable and advantageous. It is particularly advantageous, therefore, that the entrance optical unit 8 converts the entrance radiation into an optically equivalent, but compacted beam bundle. Depending on the dome 32, it is in this case possible and, if appropriate, advantageous to compensate for the optical effect of the dome 32, such that the afocal unit and the equivalent conversion relate to the entrance radiation upstream of the dome 32. From an optical point of view and the point of view of balancing and mass inertia, lightweight lenses 36, 38 are advantageous, for example composed of silicon.

The beam bundle is deflected by the prism block arranged symmetrically in the dome center and rotatably about the pitch axis 40 and rolling axis 42, the prism block forming the optical articulation 10 with regard to the optical elements. Its two identical and isosceles reversing prisms, dove prisms in this exemplary embodiment, are placed onto one another congruently in each case at their hypotenuse surface 56. The transverse axes of the hypotenuse surface 56 thus lie on the pitch axis 40 and the surface center of the hypotenuse surface 56 lies in the dome center, in which the pitch axis 40 and the rolling axis 42 also intersect. The center of symmetry of the optical articulation 10 lies in the pivoting axis or pitch axis 40.

Incident beams are refracted at the entrance surface 58 of the two reversing prisms 44, 46 towards the hypotenuse surface 56 and reflected there to the exit surface 60, in which the beams leave the reversing prism 44 and respectively 48 again. In this case, the hypotenuse surfaces 56 of the prisms 44, 46 can be reflectively coated in order to increase a reflection proportion. The reflective coating can be advantageous for use in specific spectra. With the field of view not having been pivoted, the hypotenuse surfaces 56 are aligned parallel to the optical axis of the beam path upstream of the optical device 6 and parallel to the optical axis of the beam path upstream of the optical articulation 10.

On account of the known optical operative function of a dove prism, the beam bundle is directed from the input optical unit 8 via both reversing prisms 44, 46 exactly with twice the angle with respect to the incident beam direction about the pitch axis 40 and in a direction longitudinally with respect to the rolling axis 42. In this case, the incident pupil bundle falls onto both prisms 44, 46 and is thereby split, mirrored and output in an optically offset fashion. The imaging optical properties are maintained in both resulting beam bundles, however, such that two congruent imagings of the field of view scenario are ultimately generated on the detector 14. If the field of view 30 is aligned parallel to the rolling axis 42 and thus to the axis of symmetry of the optical device 6, then the incident pupil bundle is split between the two reversing prisms 44, 46 exactly half each. This is represented in FIG. 5. As the pitching angle increases, the incident pupil bundle is imaged more and more asymmetrically onto only one of the reversing prisms 44, 46, in which case, given a pitching angle of 90°, the pupil bundle is only imaged completely onto one of the reversing prisms 44, 46, as illustrated in FIG. 7.

The two reversing prisms 44, 46 are formed from silicon and are thus distinguished by a refractive index that is very favorable in the infrared, and by thermal stability. What is furthermore advantageous is the low weight, which is advantageous for application in missiles.

The detector optical unit 12 is an imaging optical unit which could also be used without the input optical unit 8 and the optical articulation 10 for the imaging of the object scene 18. In this respect, the three optical units input optical unit 8, optical articulation 10 and detector optical unit 12 can be used independently of one another. They are also thermally passivated independently of one another.

The mechanical construction of the guided missle is now described.

The angle doubling of the optical articulation 10 requires that the prism block may only ever be rotated by half the pitching angle relative to the entrance optical unit 8—proceeding from the zero position of the frame system parallel to the rolling axis 42, that is to say in the case of a squint angle of 0°, up to the maximum pitching deflection. For this purpose, the input optical unit 8 is mounted rotatably in a mechanically separated fashion relative to the optical articulation 10 on the pitch axis 40. In this case, a 2:1 coupling of the angles of rotation can be effected by means of a separate rotational driving of the two elements. In the exemplary embodiments shown, however, the mechanical coupling is effected by a gear mechanism 62, in particular a gearwheel mechanism (see FIGS. 3 and 4). The gear mechanism 62 contains a first gearwheel 64 and a second gearwheel 66, which are connected to one another by two spur gears 68 fixedly coupled to one another. The first gearwheel 64 is rigidly connected to the prism block and the second gearwheel 66 to the input optical unit 8. By the gear mechanism connection of the spur gears 68, the two gearwheels 64, 66 are rigidly connected to one another in a rotation ratio of 2:1.

In this exemplary embodiment, the pitch movement drive both of the input optical unit 8 and of the optical articulation 10 is effected by an electromagnetic direct drive 72, which is supported on the rolling frame 70. The drive 72 is illustrated opposite the gear mechanism 62 in FIG. 4 but it is possible to integrate it in the gear mechanism 62. In the exemplary embodiment shown, the drive 72 drives the pitch movement of the input optical unit 8 directly and of the optical articulation 10 indirectly via the pitch movement of the input optical unit 8. In this case, a force flux takes place from the rolling frame 70 via the drive 72 to a supporting structure 74 of the input optical unit 8 and from there via the gear mechanism 62 to a supporting structure 76 of the optical articulation 10. By the angular coupling, the force flux is stepped down by the ratio 2:1 by the gear mechanism 62, as a result of which the mechanical system and in particular the gear mechanism 62 can be operated with little wear. The optical articulation 10 or the supporting structure 76 thereof can also be mounted on the input optical unit 8 or the supporting structure 74 thereof. In the exemplary embodiment shown, however, these two elements are mounted separately and independently of one another, that is to say not one above another, in the rolling frame 70.

The drive 72 can be regarded as an alignment device for the pivoting of the field of view 18. The mounting of the supporting structure about the pitch axis 42 can also be understood as the alignment device.

The rolling frame 70 is mounted rotatably about the rolling axis 42 with respect to a housing structure 78, which is connected fixedly and rigidly to the outer shell 34 of the homing head 4 or of the guided missile 2. In this case, the rolling drive is effected by a direct drive 80 between the rolling frame 70 and the housing structure 78. Since the input optical unit 8 and the optical articulation 10 are mounted in the rolling frame 70, they are also rotatable about the rolling axis 42.

Figure 8:
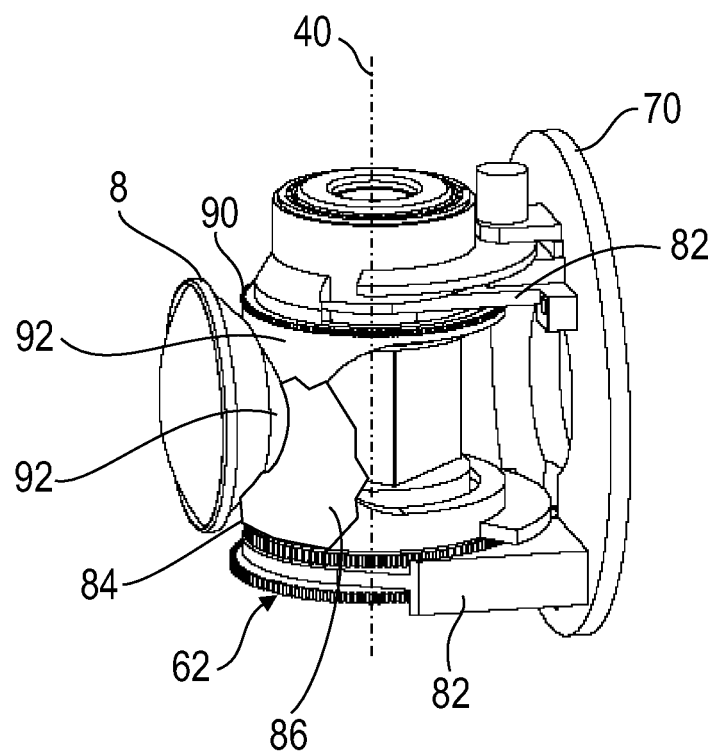
FIG. 8 is a perspective view of a shielding around an optical articulation of the homing head.

The rolling frame 70 or the structure plate thereof is illustrated perspectively in FIG. 8. The left-hand part of the figure illustrates the input optical unit 8, which is held in the rolling frame 70 by a bearing fork 82 integrally formed onto the rolling frame 70 and is mounted pivotably about the pitch axis 40. The prism block can be discerned in the interior of the bearing fork 82, the prism block being connected to the lower fork limb via the gear mechanism 62 visible at the bottom on the axis.

By virtue of the open prism structure of the optical articulation, the optical articulation 10 and also the entrance lens 48 of the detector optical unit 12 are protected only inadequately against external radiation and internal stray radiation. Therefore the optical device 6 is shielded by a shielding 84, led around the optical articulation 10, against external radiation and internal stray radiation.

The shielding 84 contains a shielding element 86 in the form of a metal film. In the exemplary embodiment shown, this metallic and flexible shielding strip is illustrated in a partly sectional fashion in FIG. 8, in order to make visible the inner prism block and the element 92 lying below the metal film, the element being rigidly connected to the input optical unit 8 and the shielding element 86 bearing on the element. The element is led around the articulation 10 at least in the rear region and is provided with an opening through which the beam path emerging from the articulation 10 can pass, to be precise at any operating angular position of the input optical unit 8. The shielding element 86 is fixed to the input optical unit 8 and can in addition at least partly cover the bearing fork 82. The shielding element 86 can be discerned in a non-sectional depiction in FIG. 3. The material of the shielding element 86 can vary depending on the application. The use of a metallic shielding element 86 is particularly advantageous since it is thereby also possible to shield interfering radar radiation that would pass through plastic, if appropriate.

The shielding element 86 is wound up in the case of integral embodiment around the optical articulation 10 on both sides or in the case of bipartite embodiment on at least one side on rolls 88 or a roll 88 and is rolled up or unrolled in the case of a pitching movement of the input optical unit 8. As a result, a movement of the shielding element 86 which is displacement-free with respect to the pitching movement can be achieved, as a result of which the shielding element is always carried along with the pitching movement with low forces and low wear. The roll 88 or both rolls 88 is or are coupled by a mechanical coupling with a pitching movement, such that they are automatically concomitantly wound up or unwound in the case of a pitching movement. In the exemplary embodiment illustrated, the mechanical coupling is effected by a gearwheel coupling 90, which can be seen in FIG. 8. In this case, each roll 88 is equipped with a spur gear which meshes on a large gear of the gearwheel coupling 90, which concomitantly rotates directly with the pitch rotation. As a result, a rolling-up or unrolling of the roll 88 is driven directly, without the need for force transmission via the shielding element 86.

As a result of the rolling-up or unrolling, the shielding element 86 is an element that is variable in terms of surface area, a mechanical coupling to the input optical unit 8 bringing about a surface variation of the shielding surface that is coupled to a pivoting about the pitch axis. In this case, the shielding element 86 is mechanically forcibly coupled in terms of its movement with the movement of the input optical unit 8, a force flux for the movement of the shielding element being led via the input optical unit 8 or an element 92 acting thereon. As a result of the shielding 84, the optical articulation 10 is shielded against all incident radiation that is not incident through the entrance or exit aperture of the optical articulation 10.

As mentioned, the optical device 4 is characterized by three units 8, 10, 12 that are substantially independent of one another. In this respect, the distances between the units 8, 10, 12 in the longitudinal axis or rolling axis 42, or the axis of symmetry of the optical device 4 can be varied in terms of their distances with respect to one another. As a result of the parallel beam path, the optical mode of action of the elements 8, 10, 12 with respect to one another is not influenced in this case, but the beam divergence, caused by the extent of the field of view 30 should be taken into consideration. In this respect, the optical device 4 is particularly suitable for accommodating one or a plurality of functional modules which can be arranged between the individual elements 8, 10, 12.

Figure 9:
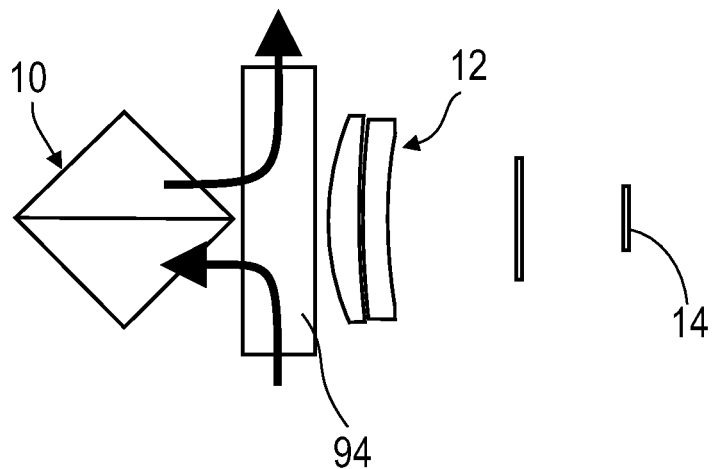
FIG. 9 is a schematic illustration of a functional element within the optical device.

One such arrangement example is outlined schematically in FIG. 9. The functional module 94 is arranged between the optical articulation 10 and the detector optical unit 12. One such functional module 94 can be used for realizing an active temperature stabilization. An optically active element, for example a laser, is likewise possible. Beam splitters are also conceivable and advantageous, as are filters or other optical elements that influence the incident or outwardly directed beam path. What is furthermore also advantageous is a glare shield, which can be introduced between the elements 10, 12 in the event of glare from outside or is permanently arranged there and is correspondingly activated. The required regulating command for a functional module 94 can be provided by the image evaluation in the homing head signal processing. In the case of an arrangement between the elements 8, 10, 12, a parallel beam path is present which allows a simple optical influencing, e.g. a damping or spectral optical influencing. The parallelism relates to beams incident in the entrance aperture of the optical device in parallel fashion. Owing to the planar field of view 30, of course, non-parallel beams also pass from the object scene 18 into the entrance aperture, the non-parallelism of which is also reproduced between the elements 8 and 10, or 10 and 12. However, this non-parallelism is not at odds with the term parallel beam path as used here, which also relates to beams incident in parallel fashion.

In the parallel beam path between the elements 8 and 10 and in particular between the elements 10 and 12 it is possible, with relatively little structural outlay, to input and output optical signals containing distance information, identification information or measurement information, for example in the optically active field of view 30. As a result of the parallelism of the beam path, therefore, a functional module 94 can be integrated there in a particularly simple manner and with minor requirements made of the functional module 94 and the adaptation of the optical device to the functional module 94.

A functional module 94 increases the structural length of the optical device 4 by at least the structural length of the functional module 94 and, on account of the extension of the field of view, at least as a further consequence the entrance aperture of the detector optical unit 12 has to be adapted, that is to say expanded.

The image processing is now described.

With the aid of the optical device 4, it is possible to image the excerpt of the field of view 30 from the object scene 18 onto the detector 14. If image comparisons over one or a plurality of successive images are to be carried out, unambiguous position information must be present with respect to each image. Falsifying effects arising from the embodiment as a result of the dove prisms in the prism block should be taken into account for this purpose. The effect of the doubled pitch angle is at least in part already mechanically compensated for by the gear mechanism coupling of the gear mechanism 62 between the input optical unit 8 and the prism block of the optical articulation 10. The compensation of the doubling of the image rotation in the reversing prism is significantly more complex. For this purpose, the control unit 16 is equipped with a specific computation module, in which all relevant image data, for example measured or calculated with respect to the last image position, can be converted to the image shift effected in the meantime and in particular to the effected image rotation of the next image. This is possible on the basis of the measured differences of roll and pitch angles and the inertial measurement angle difference detected by the inertial measurement unit 54.

Such an image compensation can proceed, for example, by the detection of a rotational movement—effected from a first to a second point in time—of the prism block or optical articulation 10 about its longitudinal axis or pitch axis 40. The relevant image data, for example of the last image, are then converted with twice the rotation angle into the new rotation position. A rotation of the rolling frame 70 that is possibly effected can be added with a corresponding sign. The rotation-compensated image thus generated can then be shifted on the basis of the measured angle differences—caused by a flight movement of the guided missile about pitch and yaw axes—correspondingly to form the compensated image. The compensated image can firstly form the basis for image comparisons and secondly be used for compensation calculation with respect to the following image.

In order to enable image comparisons in the image processing, it is necessary to determine the optical double rotation of the reversing prisms using the instantaneous pitch angle and, in particular, also the instantaneous rolling angle by a specific computation module with respect to each image. It is also possible to include the inertial movement data of the guided missile 2 in the image correction. Thus, features from temporally successive images, even in the case of a mechanically moved structure, are then comparable in the image processing.

The process device 16 is prepared for determining, with the image clock timing, an image displacement on the detector 14, which is brought about by the pivoting of the field of view and/or by a pivoting of an entrance window alignment with respect to the object scene 18 and for making available image correction data to an image processing. The image displacement can be defined with respect to a defined reference, e.g. with respect to a non-pivoted position of the field of view.

Figure 10:
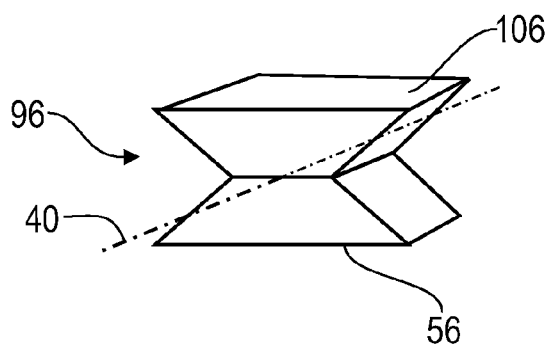
FIG. 10 is a perspective view of an optical articulation with two reversing prisms stacked one on top of the other on a narrow side.
Figure 11:
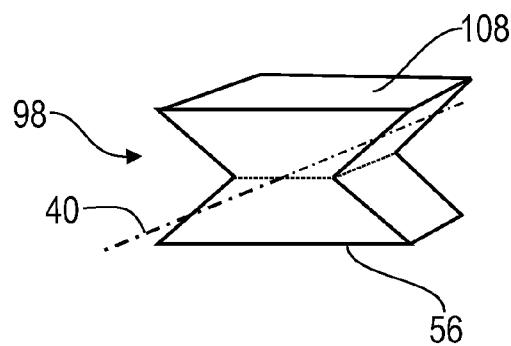
FIG. 11 is a perspective view of the optical articulation containing a single reversing prism.

FIGS. 10 to 14 show further exemplary embodiments of optical articulations 96, 98, 100, 102, 104 according to the invention. More than two reversing prisms 112, 114 can be used in the examples from FIGS. 13 and 14, whereas an optical articulation 96 containing two deflection prisms 106 is shown in FIG. 10 and an optical articulation 96 containing only one deflection prism 108, 110 is respectively shown in FIGS. 11 and 12. The deflection prism 108 is constructed, in principle, like the two deflection prisms 106 together, but only one monolithic prism block is present.

In the exemplary embodiment from FIG. 10, the two hypotenuse surfaces each serving as a reflection surface are situated on the outer sides, the mode of action of the articulation 96 corresponding to the articulation 10. The articulation 98 has an identical action to the articulation 94 and differs only mechanically in terms of its design, but not optically from the articulation 94.

Figure 12:
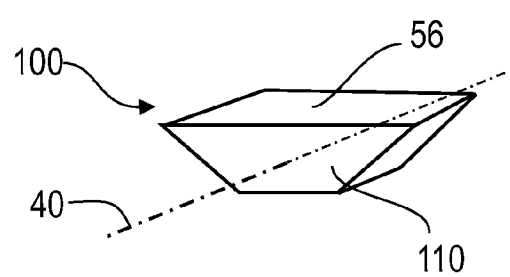
FIG. 12 is a perspective view of an alternative optical articulation containing a single reversing prism.

As shown in FIG. 12, it is also possible to use an individual roof edge prism 110 as an optical articulation 100. Depending on arrangement with respect to a field of view directed precisely towards the front, the use is restricted, if appropriate, to just one pitching direction. However, it is also possible to arrange the hypotenuse surface 56 obliquely with respect to the direction of a non-pivoted field of view or with respect to the rolling axis with a non-pivoted field of view, such that a pivoting in both directions is made possible.

Figure 13:
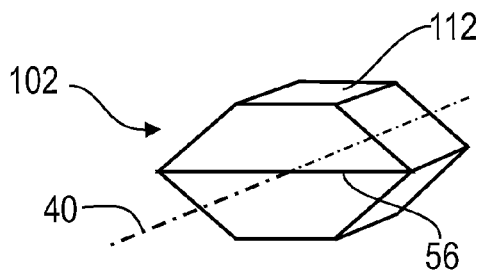
FIG. 13 is a perspective view of a further optical articulation containing two reversing prisms.

As shown by the exemplary embodiments, the form of the roof edge prism used is diversely variable. A flattened roof form, as shown in FIGS. 10, 12 and 13, is possible in the same way as the pointed roof form from the first exemplary embodiment in the first figures. A gable roof form instead of the flattened roof form or pitched roof form is also possible. The pointed roof form has the advantage that the roof ridge can readily be used for the enclosure of the respective prism, since the roof ridge is not absolutely needed optically.

Figure 14:
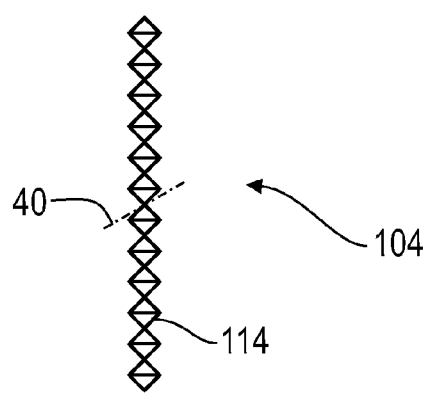
FIG. 14 is an illustration of a further embodiment of an optical articulation containing a multiplicity of reversing prisms.

In the examples from FIG. 13 and FIG. 14, two reversing prisms 108, 110 are in each case placed one on top of another by their reflection surface or hypotenuse surface 56 and form a prism block. In FIG. 14, the illustration of the flattening has been omitted for reasons of simplification, any of the roof forms described being possible. Instead of the embodiment from FIG. 13, it is also possible for a plurality of pairs, e.g. two pairs, to be placed one on top of another, the placement one on top of another being particularly expedient at the roof flattening, which is expediently parallel to the hypotenuse surface 56. In the case of the exemplary embodiment illustrated in FIG. 13, the reversing prisms 108 are flattened parallel to the hypotenuse surface in each case at their side opposite the hypotenuse surface, such that the reversing prisms 112 can be placed one on top of another at these flattened surfaces. A stack of any desired number, e.g. three, four, five or more, of reversing prisms 112 lying one on top of another is thus formed. The number of reversing prisms 104-110 is arbitrary in principle, as is also indicated in FIG. 14. The optical operative principle illustrates that microprisms 114 can also be used, which are distinguished by a thickness perpendicular to the hypotenuse surface of a maximum of 1 mm, in particular a maximum of 0.2 mm. Optical articulations 104 that are extremely light in terms of weight can be produced as a result.

In the case where a plurality of reversing prisms are used, they also need not be of the same size. The combination of a larger with a smaller reversing prism is entirely possible and advantageous.

The modes of action of the optical articulations 96-104 are identical to the above-described mode of action of the optical articulation 10, if appropriate more than two images of the object scene 18 being generated. It is particularly advantageous if the deflection prisms 106-114 are jointly pivoted about the pitch axis 40 and that they are afocal in order to avoid image disturbances during pivoting.

The invention claimed is:

1. An optical device for guiding radiation from an object scene to a detector, the optical device comprising:
   a detector optical unit;
   an alignment device;
   an input optical unit being pivotable by said alignment device for changing a field of view of the detector relative to a predetermined direction;
   a rotation device;
   an optical link for guiding a beam into said detector optical unit, said optical link disposed between said input optical unit and said detector optical unit, said optical link being rotatable by said rotation device, said optical link having a reversing prism, in which a parallel beams bundle incident in a front roof surface of said reversing prism is refracted towards a hypotenuse surface of said reversing prism, is reflected by said hypotenuse surface and refracted again at a rear roof surface of said reversing prism;
   said rotation device being embodied such that said optical link is concomitantly pivoted with always half of a pivoting angle of said input optical unit;
   said rotation device and said alignment device being mechanically forcibly coupled;
   said input optical unit disposed upstream of said optical link for compacting entrance radiation incident from the object scene by a factor of 1.2 to 10; and
   said input optical unit being afocal for guiding a parallel beam incidence from the object scene in parallel fashion onto said optical link.

2. The device according to claim 1, wherein said hypotenuse surface of said reversing prism is aligned parallel with an optical axis of said optical link.

3. The device according to claim 1, wherein said optical articulation has at least two reversing prisms which act identically in the beam path and which adjoin one another at their hypotenuse surfaces and which, in conjunction with said detector optical unit, in each case image an overall image of the object scene onto the detector.

4. The device according to claim 1, wherein an axis of the field of view runs through a center of symmetry of said optical link.

5. The device according to claim 1, wherein said optical link has at least three reversing prisms disposed in an adjacent manner in the beam path and which, in conjunction with said detector optical unit, in each case image an overall image of the field of view onto the detector.

6. The device according to claim 1, further comprising an entrance window that effects mechanical shielding from surroundings, said input optical unit compensating for optical properties of said entrance window in such a way that an afocal nature is maintained in a combination of said entrance window and said input optical unit.

7. The device according to claim 1, wherein said optical link is afocal and the beam path is parallel both upstream and downstream of said optical link.

8. The device according to claim 6, wherein said input optical unit and said optical link are in each case mounted independently of one another in terms of their movement for the changing of the field of view of the detector.

9. The device according to claim 6, further comprising a shielding which is led around said optical link and which shields said optical link against incident radiation that is not incident through an entrance or exit aperture of said optical link.

10. The device according to claim 9, wherein said shielding has at least one shielding element which is variable in terms of surface area, and a mechanical coupling to said input optical unit, which brings about a surface variation coupled to a changing of the field of view of the detector.

11. The device according to claim 10, wherein said shielding has at least one unwinding device and said shielding element is unwound.

12. The device according to claim 10,
further comprising an element working on said input optical unit; and
wherein said shielding element is mechanically forcibly coupled with a movement of said input optical unit in terms of movement.

13. The device according to claim 1, further comprising a processing device for determining with an image clock timing, an image displacement on the detector with respect to a defined reference, which is brought about by at least one of the changing of the field of view of the detector or by a pivoting of an entrance window alignment with respect to the object scene and for making available image correction data to an image processing.

14. The device according to claim 1, further comprising a functional model, a parallel beam path being present between said optical link and said detector optical unit, said functional module for at least one of damping or spectral optical influencing of the beam path disposed in said beam path.

15. A homing head for a guided missile, comprising:
a detector;
an optical device for guiding radiation from an object scene to said detector, said optical device containing:
an alignment device;
an input optical unit being pivoted by said alignment device for changing a field of view of the detector relative to a predetermined direction;
a detector optical unit;
a rotation device;
an optical link for guiding a beam into said detector optical unit, said optical link disposed between said input optical unit and said detector optical unit, said optical link being rotatable by said rotation device, said optical link having a reversing prism, in which a parallel beams bundle incident in a front surface of said reversing prism is refracted towards a hypotenuse surface of said reversing prism, is reflected by said hypotenuse surface and refracted again at a rear roof surface of said reversing prism;
said rotation device being embodied such that said optical link is concomitantly pivoted with always half of a pivoting angle of said input optical unit;
said rotation device and said alignment device being mechanically forcibly coupled;
said input optical unit disposed upstream of said optical link for compacting entrance radiation incident from the object scene by a factor of 1.2 to 10; and
said input optical unit being afocal for guiding a parallel beam incidence from the object scene in parallel fashion onto said optical link; and
a partly spherical entrance window being a dome and having a dome center, through which pivoting axis of the input optical unit for changing the field of view runs and in which a center of symmetry of said optical link is disposed.

* * * * *